(No Model.) C. LOYENS & A. PAULSON. 7 Sheets—Sheet 4.
BOX SHUCK MAKING MACHINE.

No. 556,996. Patented Mar. 24, 1896.

(No Model.) 7 Sheets—Sheet 5.
C. LOYENS & A. PAULSON.
BOX SHUCK MAKING MACHINE.

No. 556,996. Patented Mar. 24, 1896.

Witnesses:
Jas. E. Hutchinson.
Henry C. Hazard.

Inventors:
Charles Loyens and Andere Paulson, by
Prindle and Russell, their Attys.

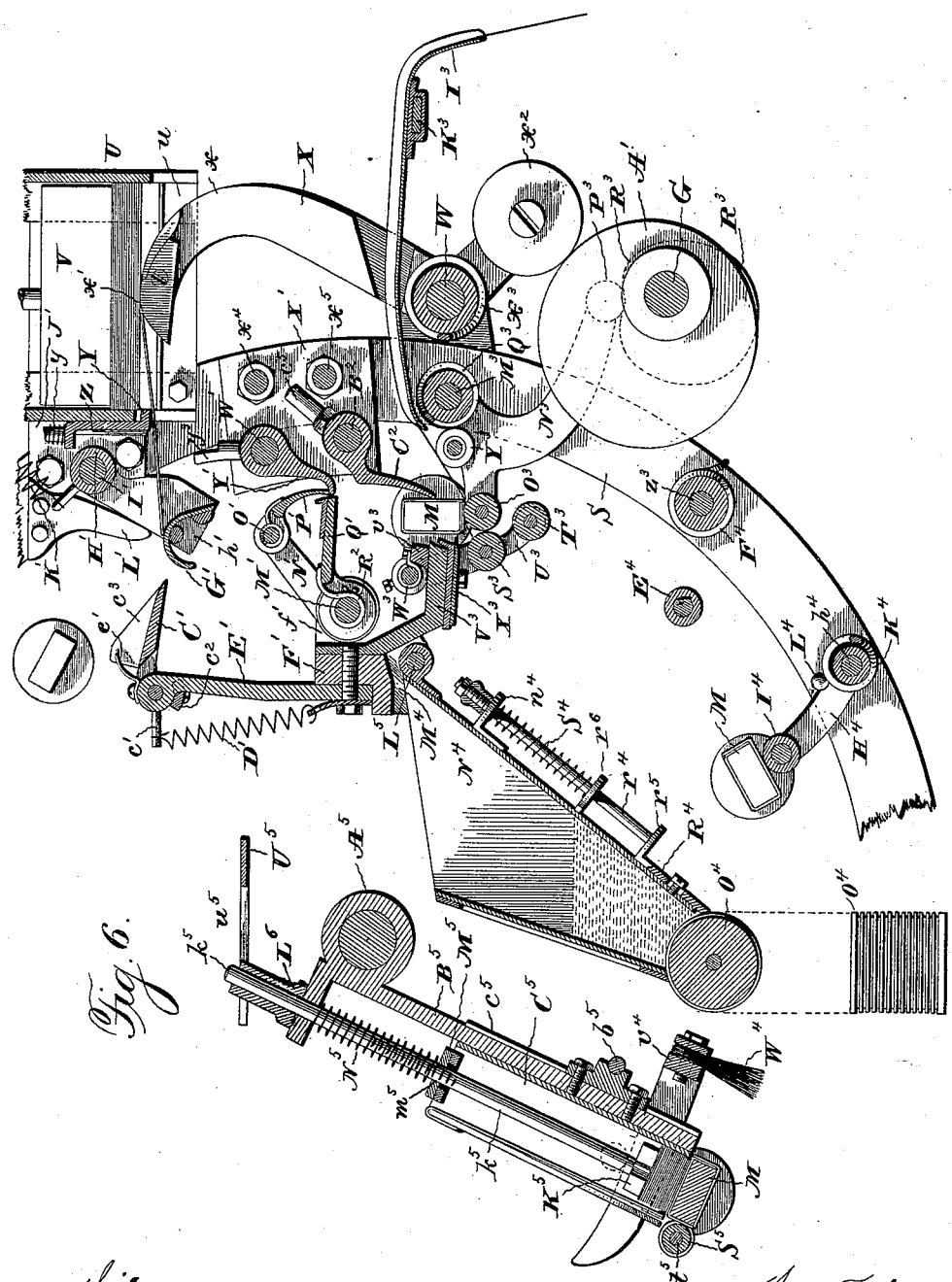

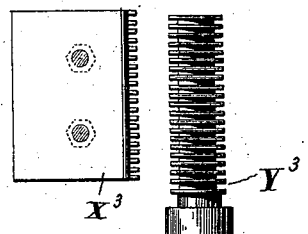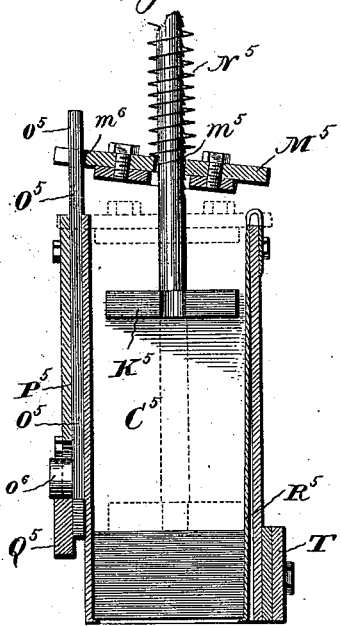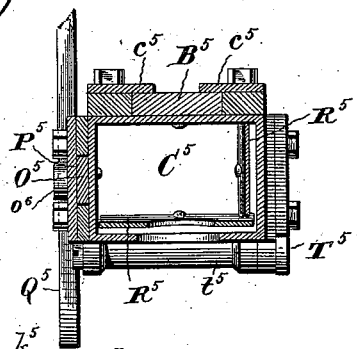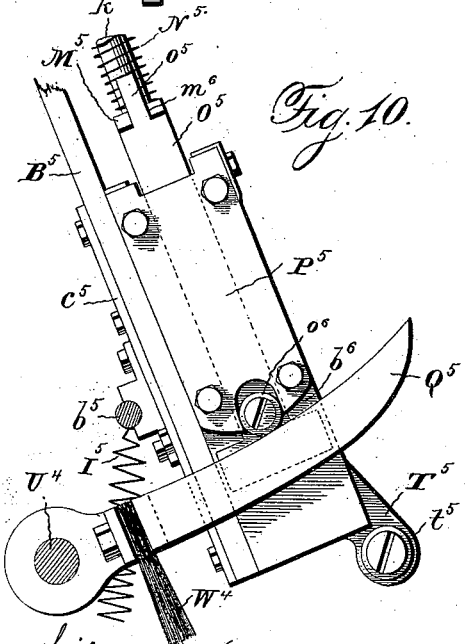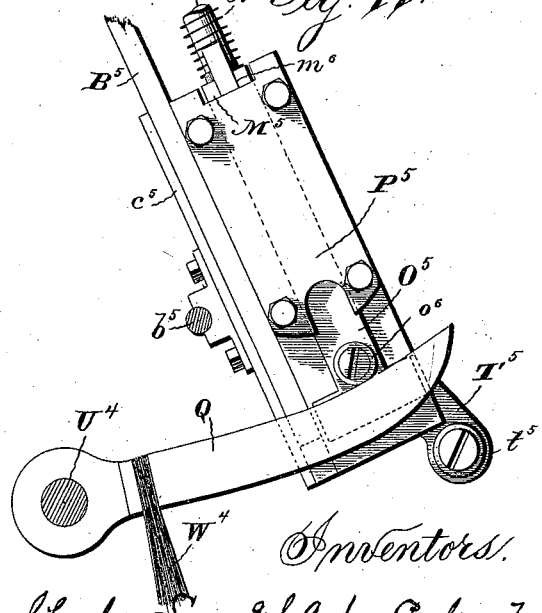

UNITED STATES PATENT OFFICE.

CHARLES LOYENS AND ANDERS PAULSON, OF BREDA, NETHERLANDS, ASSIGNORS TO THE DIAMOND MATCH COMPANY, OF CHICAGO, ILLINOIS.

BOX-SHUCK-MAKING MACHINE.

SPECIFICATION forming part of Letters Patent No. 556,996, dated March 24, 1896.

Application filed August 13, 1895. Serial No. 559,146. (No model.) Patented in Belgium July 31, 1893, No. 105,605; in France August 31, 1893, No. 232,549; in Germany November 11, 1893, No. 79,104; in England January 18, 1894, No. 1,160; in Sweden January 21, 1894, No. 5,754; in Norway February 14, 1894, No. 3,648; in Denmark June 21, 1894, and in Austria June 24, 1894, No. 9,961/24,334.

*To all whom it may concern:*

Be it known that we, CHARLES LOYENS and ANDERS PAULSON, subjects of the Queen of the Netherlands, residing at Breda, in the Province of Brabant, Netherlands, have invented certain new and useful Improvements in Box-Shuck-Making Machines, (patented in Belgium July 31, 1893, No. 105,605; in France August 31, 1893, No. 232,549; in Germany November 11, 1893, No. 79,104; in England January 18, 1894, No. 1,160; in Sweden January 21, 1894, No. 5,754; in Norway February 14, 1894, No. 3,648; in Denmark June 21, 1894, and in Austria June 24, 1894, No. 9,961/24,334;) and we do hereby declare that the following is a full, clear, and exact description thereof, reference being had to the accompanying drawings, in which—

Figure 1:
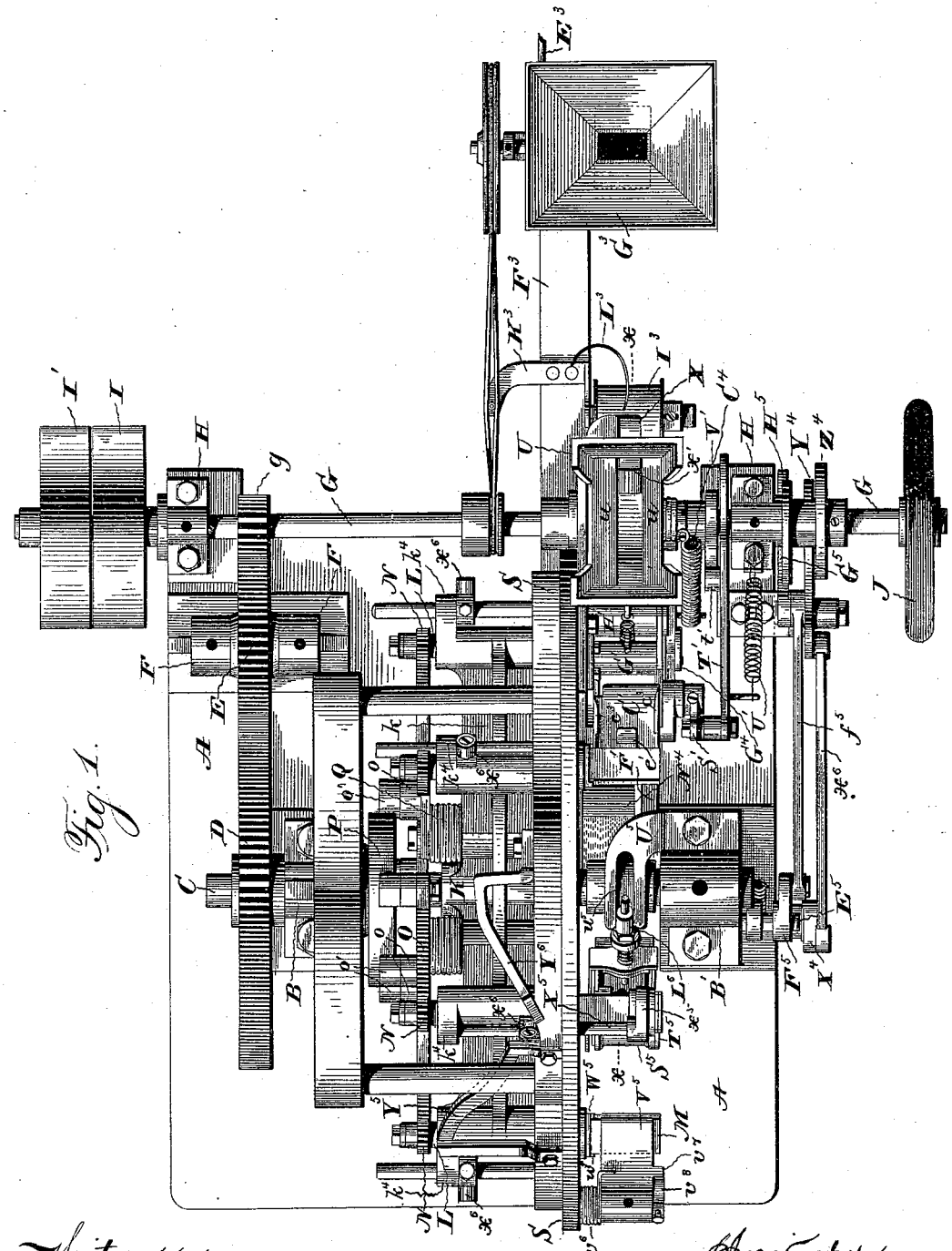
Figure 2:
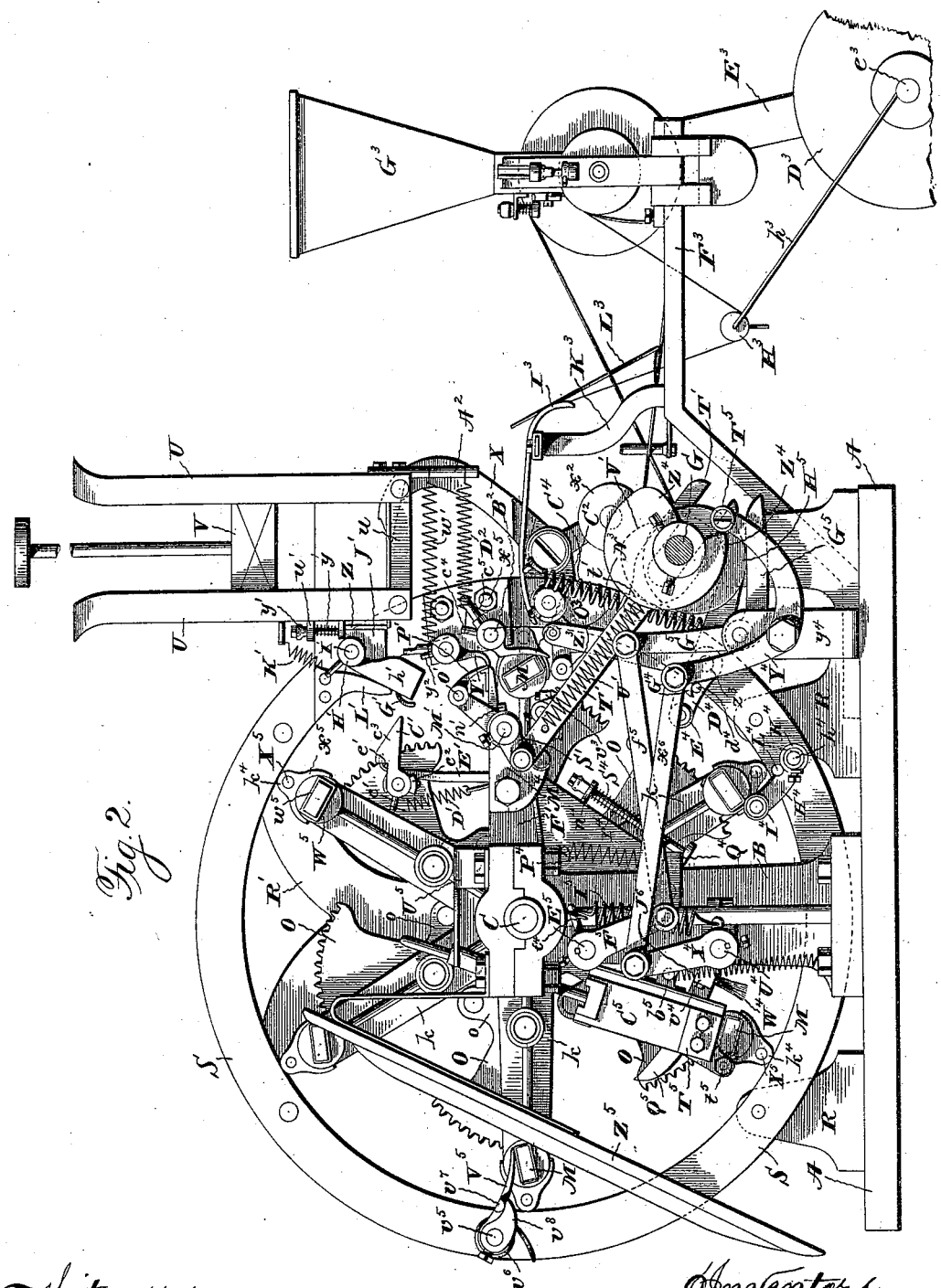
Figure 3:
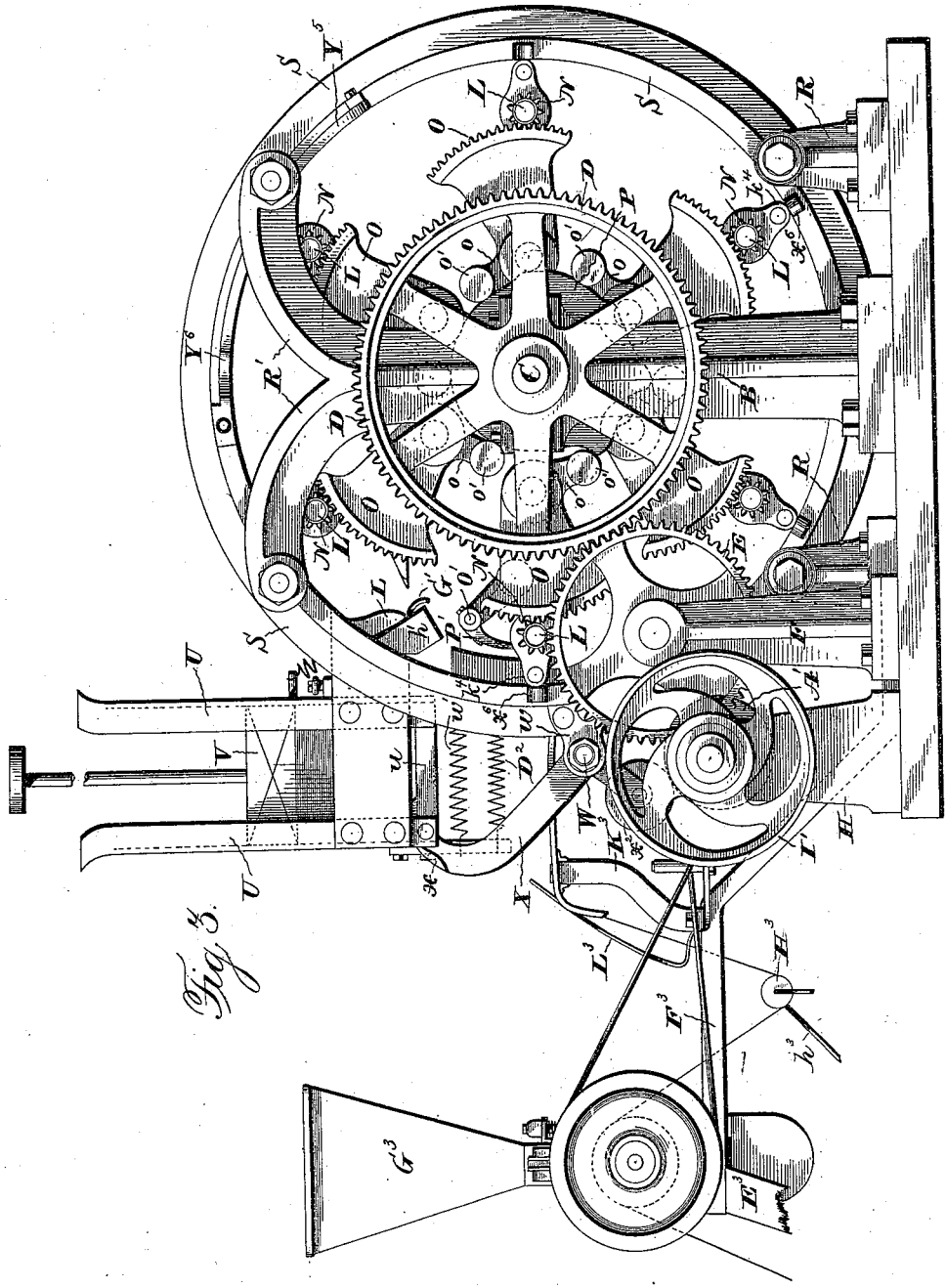
Figure 4:
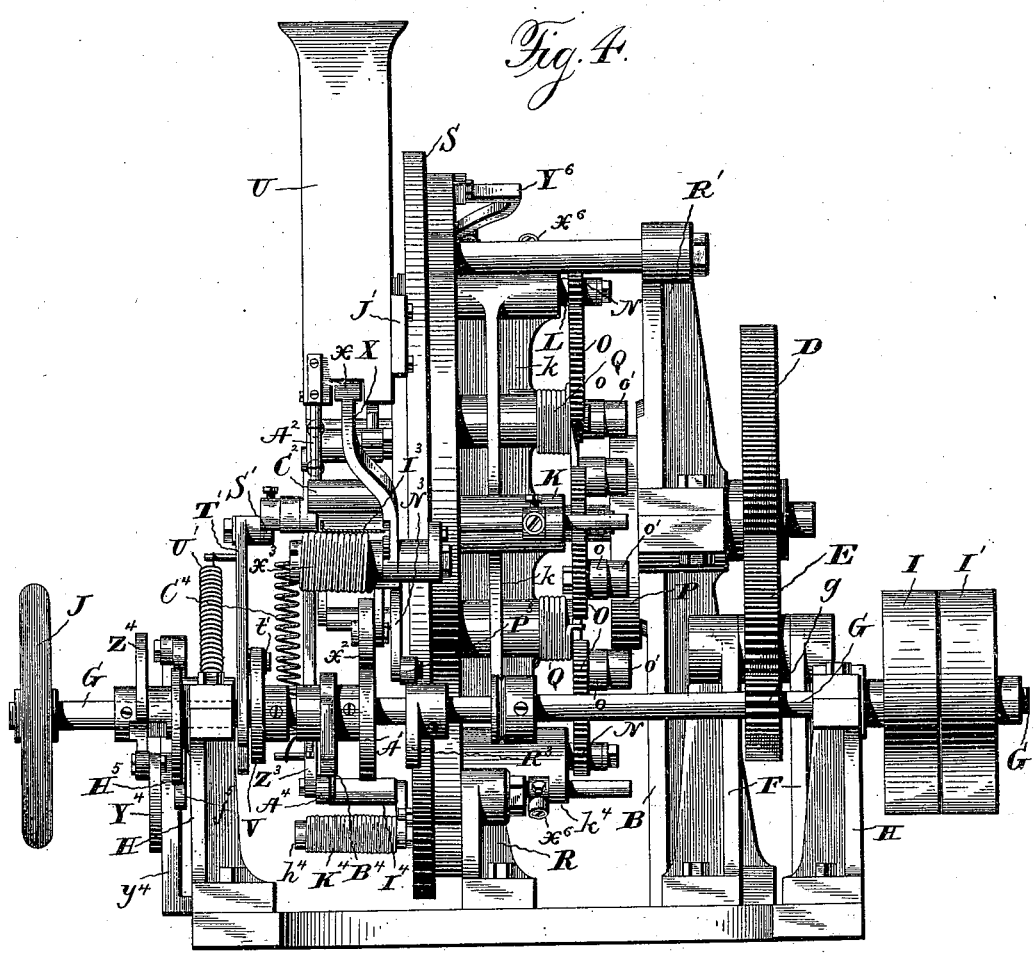
Figure 5:
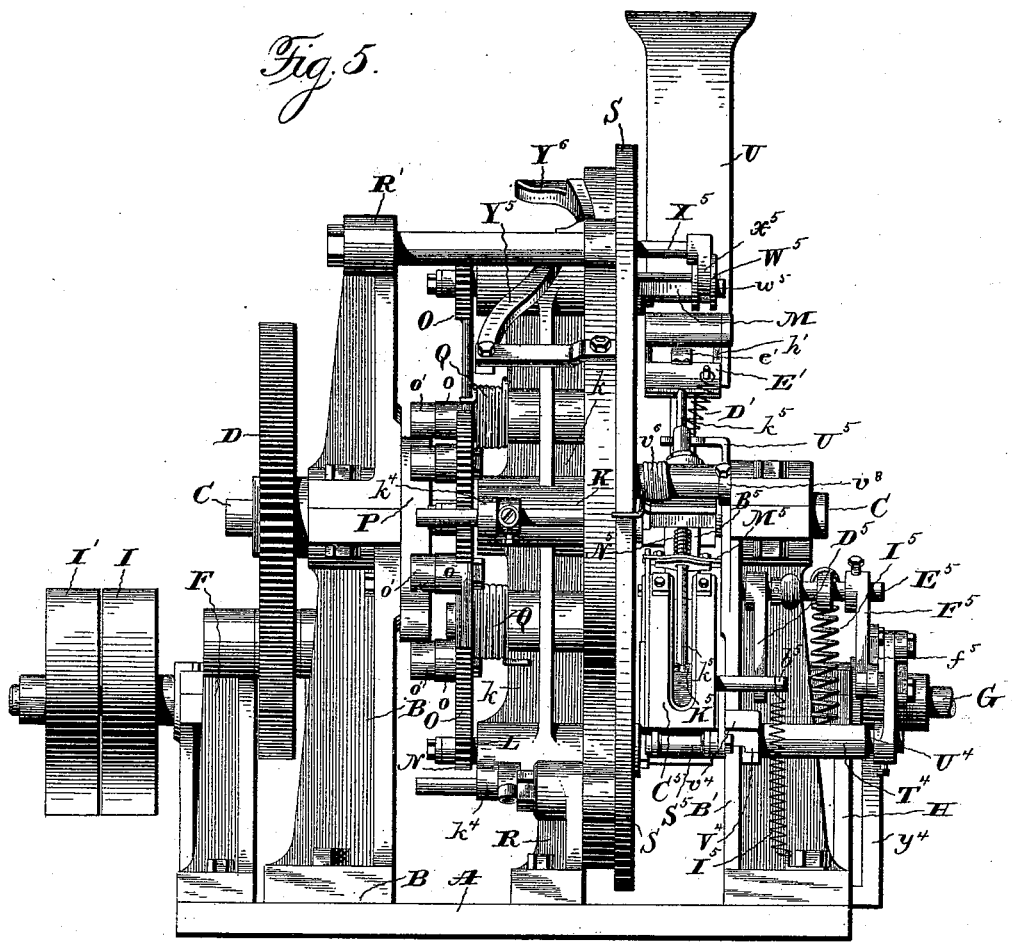

Figure 1 is a plan view of a machine constructed in accordance with our invention. Figs. 2 and 3 are respectively elevations of opposite sides thereof. Figs. 4 and 5 are respectively elevations of opposite ends of said machine. Fig. 6 is a vertical section on the line $x\,x$ of Fig. 1. Fig. 7 is a detail view of the paper-cutting devices. Fig. 8 is a detail vertical section of the label-hopper and feeding mechanism. Fig. 9 is a horizontal section thereof. Figs. 10 and 11 are views of the same in side elevation, showing, respectively, the position of parts before and after the label-feeding follower is released.

Letters of like name and kind refer to like parts in each of the figures.

The object of our invention is to enable covers or casings for boxes for matches, &c., to be rapidly and cheaply made; and to this end said invention consists in the mechanism and in the construction and combination of parts thereof, substantially as and for the purpose hereinafter specified.

The description of box cover or casing for the manufacture of which we have designed our machine is one in the form of a flat-sided tube with unclosed ends and adapted to slide over the box, and as usually constructed is made from a veneer of wood, covered externally and held in shape by paper.

In the carrying of our invention into practice we employ a suitably-supported base-plate A, upon which we mount the parts of our machine. Bolted to said plate are two standards B and B', that at their upper ends have bearings for a horizontal shaft C, which at one end has keyed or otherwise fastened to it a gear-wheel D that meshes with a smaller gear E, journaled in bearings upon standards F and F, secured to the base-plate A, and which gear E meshes with and receives motion from a pinion $g$ keyed to a shaft G, that is journaled in bearings upon standards H and H, located, respectively, at opposite sides of the base-plate A, to which they are bolted. At one end said shaft is provided with fast and loose band-pulleys I and I' and at its other end with a balance or fly wheel J.

Keyed or otherwise fastened to the shaft C, at a point between the two standards B and B', is a spider consisting of a hub K and six radial arms $k$ and $k$, each of which arms, at its outer end, journals a shaft L, that at one end has attached to it an oblong flat-sided block M and at its other end is provided with a pinion N. Meshing with each pinion N is a segmental rack O, that is pivoted at its inner end to the arm $k$, and at such end has an arm $o$ extending substantially at right angles thereto, which carries a roller $o'$ that engages a cam P, rigidly attached by bolts or otherwise to the adjacent standard B. A coiled spring Q placed around the pivot of each rack rack O, with one end engaging the latter and the other the appropriate arm N of the spider, serves to hold the roller $o'$ yieldingly against the cam.

The blocks M, which constitute a series of mandrels, besides their revolution with the shaft C have each an independent rotation on their respective shafts L, caused by the vibration of the racks O by the cam P, as the spider is revolved by the shaft, the shape of such cam being such that at certain points in their revolution with the shaft the racks are rocked in one direction upon their pivots, while at other points they are rocked in the reverse direction. The objects of these motions of the mandrels will appear hereinafter.

Bolted to two brackets R and R, that are secured to the base A and to a Y-shaped bracket R' bolted to the top of the standard B adjoining the cam P, is an annular or ring-shaped support or frame S, whose interior diameter is slightly greater than that of the mandrel-carrying spider, and which is concentric with the latter. Secured to a horizontally-projecting plate J, suitably attached to said frame S, is a hopper U formed by two parallel vertical plates such distance apart as to permit the easy passage between them of veneer blanks, and each having on its opposite side an inwardly-projecting flange to engage the side edges of such blanks. The bottom of the hopper U is formed by two separated parallel bars $u$ and $u$ connecting the lower ends of the two vertical plates, being attached to the flanges thereof. Blanks are moved downwardly through the hopper by a weighted follower V.

Journaled upon a fixed shaft W, attached by a bracket $w$ to the frame S, directly beneath the hopper U, is an arm X, whose upper curved portion $x$ is adapted to be reciprocated across the bottom of the hopper between the two bars $u$ and $u$ to feed blanks out of the same, one at a time, into the path of travel of the mandrels M. The end of said curved portion $x$ is provided with a shoulder $x'$ of such height as to engage the edge of but a single blank at a time to remove the same from the hopper. To prevent the removal of more than one blank at a time from the hopper a block Y is arranged at the exit side thereof, whose under side is adjusted relative to the upper side of the arm portion $x$ as to leave space for the passage of but one blank. Said block is held to the plate forming the inner end of the hopper by flanged plates Z and Z, that overlap opposite sides of the same, and is provided at its upper end with a stem $y$ that passes through a lug $u'$ projecting from the hopper side, and upon its end above said lug is provided with an adjusting-nut $y'$. Said block is moved yieldingly downward by means of a coiled spring encircling the stem and bearing at its ends against the lug $u'$ and the upper side of the block.

The arm X is moved in the direction to feed a blank from the hopper by means of a cam A' upon the driving-shaft G, which engages a roller $x^2$ carried by an extension of said arm, and a coiled spring $x^3$ operates to move said arm in the opposite direction. In line with the bottom of the hopper U, at the side thereof at which the blank is fed out, is a pivoted plate C', that is yieldingly held in a horizontal position by means of a coiled spring D', connected at one end to a pin $c'$ attached to the plate and at its other end to a relatively-fixed point. Said plate is pivoted to the upper end of a bar E', that is secured to a bracket F' bolted to the inner side of the adjacent standard B'. A stop-bar $c^2$, fixed to the plate C', by engaging the bar E' limits the upward movement thereof by the spring D'. The forward end of the blank when the latter is fully fed out of the hopper U rests upon the plate C', and said plate, to confine the blank laterally, has at each side a vertical flange $c^3$ to engage each side edge thereof, while to prevent the blank being carried too far by the arm X a stop $e'$ is attached to the upper end of the bar E', against which the forward edge of the blank strikes.

Between the hopper and the plate C' is a curved plate G', with its convex side upward, that is attached to the lower ends of two arms $h'$ which project from a sleeve H' pivoted to a rod I' attached to and projecting from the side of the hopper-supporting plate J'. Said plate G is held yieldingly upward by a coiled spring K' attached at one end to a pin that projects from the sleeve H' and at its other end to a pin projecting from the hopper side. A stop L' secured to the plate J' limits the movement of the plate G' by the spring by engaging the inner one of the two arms $h'$. The highest surface of said plate is slightly below the path of a blank as it comes from the hopper U, and the same and the plate C' form yielding supports for the blank and operate to bend and press the same against the two long sides of the mandrel as the blank is caught in mid-length by the latter and is carried onward therewith in its revolution by the shaft C.

Directly below the plate C' and journaled in two lugs $f'$ and $f'$ projecting from the bracket F' is a horizontal shaft M', to which are fixedly attached two upwardly-extending arms N' and N'. Pivoted to a rod O' connecting the upper ends of the latter is a curved finger P', which at its free end is pressed yieldingly against the upper end of a plate Q' pivoted to turn freely upon the shaft M' and held yieldingly against a stop-lug $n'$ upon the hub of one of the arms N' by means of a coiled spring $R^2$ encircling the shaft M'.

For rocking said shaft to move the parts carried thereby to and fro a crank-arm S' is attached to the outer end thereof, to which is connected a bar T' that carries a roller $t'$, which is yieldingly held by a spring U' in contact with a cam V' upon the driving-shaft G, and thus the bar is reciprocated to vibrate the crank-arm. The movement of the shaft in one direction carries the finger P' and plate Q' together until the latter strikes the partially-folded blank upon the mandrel at the near upper corner of the latter, when said plate is stopped, and the finger continuing its movement engages and bends upon the upper narrow side of the mandrel one free end of the blank projecting above the same. During such bending the plate Q by engaging the blank, as above indicated, holds the side whose end portion is being bent closely and firmly to the mandrel. The rocking of said shaft M' in the opposite direction moves the finger P' and plate Q' out of the path of the next succeeding mandrel preparatory to co-operating with it.

Pivoted to a rod W', projecting horizontally from a plate X' secured to the annular frame S, is a finger Y' that extends inward and downward relative to the path of the mandrels and is adapted to co-operate therewith on the side opposite from the finger P'. The function of said finger is to engage and fold the free end portion of the second side of the blank so as to overlap the portion previously folded by said finger P'. A coiled spring $w'$, attached at one end to a pin $y^2$ projecting from said finger and at its outer end to a post or rod $A^2$ depending from the hopper U, operates to hold the finger yieldingly against the mandrel or a blank thereon. A pin $y^3$ projecting from the finger Y' by engaging a stud $x^4$ on the plate X' limits the movement of the finger Y' by the spring. Said finger also engages the blank and keeps it from slipping off the mandrel after it is folded by the plates C' and G'.

Projecting horizontally from the plate X' at a point below the finger Y' is a rod $B^2$, to which is pivoted a finger $C^2$, whose free end is held yieldingly in the path of the mandrels by a coiled spring $D^2$ attached at one end to a pin $c^4$ projecting from said finger and at its other end to the post $A^2$. A pin $c^5$ projecting from the finger by engaging a stud $x^5$ upon the plate X' limits the movement of the finger by the spring $D^2$. The finger $C^2$ is normally in such position that as soon as the second blank end has been folded upon the mandrel by the finger Y' said finger $C^2$ engages the overlapping ends of the blank and holds the same upon the mandrel, the finger remaining in contact with the blank until the latter is carried to the devices that next operate thereon. The folded blank is now ready to receive the covering and securing paper, and such is drawn off a roll $D^3$, placed upon a spindle $e^3$ that projects horizontally from an arm $E^3$, which is secured at its upper end to a bar $F^3$ bolted to the base-plate A. The upper side of the paper is supplied with glue or paste from a hopper-like receptacle $G^3$ by means precisely similar to such as are employed for a like purpose in the machine shown in our pending application, Serial No. 559,147, filed August 13, 1895. As such glue-supplying mechanism is fully shown and described in said other application, and as no claim thereto is made herein, it is not thought necessary to specifically describe the same in this specification.

From the glue-applying mechanism the paper is passed to and under a tension-roller $H^3$ carried at the end of a swinging rod $h^3$, which is pivoted to the roll-spindle $e^3$, and thence to and over a guide-plate $I^3$, which delivers the paper into the path of the mandrels, said guide-plate being supported by a standard $K^3$ attached to and rising from the bar $F^3$. A light spring-finger $L^3$ attached at its lower end to the foot of the standard $K^3$ bears at its upper end upon the paper as it passes onto the guide-plate, and serves to hold the same in place thereon and prevent its being drawn backward by the weight of the roller $H^3$. Just below the inner end of the guide-plate there is a pin $M^3$ projecting horizontally from the annular frame S, upon which is pivoted a bell-crank lever $N^3$ carrying upon one arm a horizontal roller $O^3$ that lies in the path of the mandrels and having upon its other arm a roller $p^3$ that is held yieldingly by a coiled spring $Q^3$ against a cam $R^3$ upon the driving-shaft G. The roller $O^3$ by means of the cam and spring is actuated to first paste the paper near its free end to the overlapped ends of the blank upon the lower small side of the mandrel, and also to the side of the blank upon one of the long sides of the mandrel. During such operation of the roller $O^3$ the short free end of the paper is folded and pressed to the opposite side of the blank by two rollers $S^3$ and $T^3$ that successively engage the same. Said rollers are pivoted one below the other at their ends to two bars $U^3$ and $U^3$ that are pivoted at their upper ends to a plate $V^3$, which is secured to the bracket F. A coiled spring $W^3$ holds the bars $U^3$ and $U^3$ so as to present the rollers yieldingly in the path of the mandrels, the movement of said bars by the spring being limited by stops $v^3$ and $v^3$ upon the plate $V^3$.

Attached to the under side of the plate $V^3$ is a paper-cutting knife $X^3$ having a serrated cutting-edge, and with which a roller $Y^3$, having circumferential grooves to receive the teeth of the knife, co-operates, said roller being attached to the upper end of a lever $Z^3$, pivoted upon a pin $z^3$ that projects horizontally from the annular frame S. An extension of said lever carries a roller $A^4$ that engages the periphery of a cam $B^4$ upon the driving-shaft G. Said cam positively moves the roller $Y^3$ away from the knife, while a coiled spring $C^4$ moves said roller $Y^3$ toward and against the knife. Also pivoted upon the pin $z^3$ is an arm $D^4$ that at its end carries a horizontal roller $E^4$ held yieldingly in the path of the mandrels by a coiled spring $F^4$. A pin $d^4$, projecting from the arm $D^4$ and engaging a finger $G^4$ attached to the pin $z^3$, limits the movement of the arm $D^4$ by said spring.

Attached to and projecting horizontally from the annular frame S, a short distance from the pin $z^3$, is a pin $h^4$, upon which is pivoted an arm $H^4$ that at its end carries a horizontal roller $I^4$, which is held yieldingly by a coiled spring $K^4$ in the path of the mandrels. A stud $L^4$ projecting from the frame S by engaging the arm $H^4$ limits the movement of the latter by the spring $K^4$.

The two rollers $E^4$ and $I^4$ operate in succession upon the paper to fold and paste the same upon the blank end and side not acted upon by the roller $O^3$, and thus complete the box casing or cover.

For attaching a label to the completed box-cover the following-described mechanism is employed: Pivoted at one of its upper edges to a rod $L^5$, attached by two plates $M^4$ and $M^4$ to the bracket F', is a triangular-shaped paste or glue receptacle $N^4$, whose bottom is closed by a rotatable circumferentially-grooved roller $O^4$, journaled in projections from the side plates of the receptacle. The lower side of the roller is kept by the weight of the receptacle, supplemented by a coiled spring $P^4$, in the path of the mandrels, and downward movement thereof being limited by a stop $Q^4$ that engages the hopper, and said roller is adapted to ride over and apply paste to the surface of the portion of the box-cover upon the upper side of the mandrel, the roller being lifted slightly as the mandrel strikes it and swinging the receptacle upward, so that the roller rests with sufficient pressure upon the paper to apply paste thereto. The revolution of the roller by its contact with the box-cover keeps its periphery supplied with paste from the receptacle. A plate $R^4$ at the side of the receptacle at which the roller emerges, and having its lower edge resting upon the periphery of the roller, prevents the issuance of an excess of paste and spreads the same evenly upon the roller. Said plate is attached to the hopper by two screws, and has a stem or rod $r^4$, projecting upward from a lug $r^5$, which stem passes through an opening in a lug $n^4$ projecting from the receptacle, and above the latter is provided with an adjusting-nut for raising the plate $R^4$ from the roller. A coiled spring $S^4$, encircling the stem and interposed between the lug $n^4$ and a collar $r^6$ upon the stem, operates to move the plate in opposition to the nut.

Journaled in a bearing $T^4$ bolted to the standard $B'$ is a shaft $U^4$ that at its inner end carries a radial arm $V^4$ that has a horizontal extension $v^4$, to which is fastened a brush $W^4$ that is adapted to engage the pasted surface of the paper immediately after leaving the paste-applying roller $O^4$, to spread the paste smoothly and evenly over the same. To rock the shaft $U^4$ to move the brush into and out of contact with the paper a crank-arm $X^4$ upon its outer end is connected by a link $x^6$ to one arm of a lever $Y^4$ pivoted to a bracket $y^4$ secured to the base A, the other arm of said lever having a roller $T^5$ that engages a cam $Z^4$ upon the driving-shaft G.

Pivoted to turn freely upon the shaft C between the standard $B'$ and the mandrel-spider is a sleeve $A^5$, from which projects downwardly an inclined bar $B^5$, upon which is mounted a label-holding hopper $C^5$. Said hopper is connected with the bar so as to be movable longitudinally thereon by means of two flanged bars $c^5$ and $c^5$ upon its under side, which engage the opposite sides of said bar.

Attached to and projecting horizontally from the lower side of the bar $B^5$ is a rod $b^5$ that near its outer end engages an arm $D^5$ rigidly attached to the inner end of a rock-shaft $E^5$ journaled in a bearing secured to the standard $B'$. At its outer end said shaft has fastened to it a crank-arm $F^5$ that is connected by a link or pitman $f^5$ with one arm of a lever $G^5$ pivoted to the bracket $y^4$ and having its other arm engaging a cam $H^5$ upon the driving-shaft G.

A coiled spring $I^5$, connected at one end to an arm $e^4$ on the shaft $E^5$ and at its other end to a relatively fixed point, holds the lever $G^5$ yieldingly in contact with the cam $H^5$ and operates, when permitted by the latter, to swing the label-hopper upon its pivotal connection with the shaft C in the direction of travel of the series of mandrels. The shaft $E^5$ is turned in the opposite direction by the action of the cam $H^5$ to permit the reverse movement of said hopper, which is caused by gravity supplemented by a spring $J^5$ attached at one end to the rod $b^5$ and at its other end to the foot of the standard $B'$.

Movable vertically in the hopper to feed the labels therefrom is a follower $K^5$ attached to the lower end of a rod or stem $k^5$ that projects upward and passes through a guide $L^6$ attached to the upper end of the bar $B^5$ and between the follower and said guide. Such rod passes through an opening $m^5$ in a bar $M^5$, which opening is of such diameter as to permit said bar to rock relative to the rod, so as to engage and bind against the same. A coiled spring $N^5$ encircling the rod between the guide and said bar normally holds the latter in such binding engagement with the rod. The latter is preferably provided with ratchet-teeth in its side to permit the bar to positively engage therewith. At one end the bar $M^5$ rests upon the upper end of a plate $O^5$, with which it is held in engagement by means of a projection $o^5$ of said plate, which engages a notch $m^6$ in the end of the bar. The latter is adapted to rock upon the end of the plate, which serves as a pivot or fulcrum therefor. The opposite end of the bar $M^5$ is adapted to engage the upper end of the corresponding side of the hopper to rock the bar against the pressure of the spring $N^5$ to effect the release of the follower-rod.

The plate $O^5$ is movable longitudinally in a guideway $P^5$ upon the hopper and is moved upward by an arm $Q^5$ attached to and moving with the brush-carrying bar $v^4$, which arm engages a roller $o^6$ upon said plate, while its downward movement is caused partly by gravity and partly by the spring $N^5$ bearing against the bar $M^5$. The arm $Q^5$ also operates to slide the hopper upward upon the bar $B^5$ by engaging the lower end of a plate $b^6$ attached to the hopper and forming part of the plate-guide $P^5$. Downward movement of the hopper upon the bar $B^5$ is effected by gravity and the spring $J^5$.

The labels are held from falling out of the hopper by light pressure applied to those in the bottom portion thereof from two spring-plates $R^5$ and $R^5$ that are attached at their upper ends to the hopper-walls and bear respectively against the edges of the labels upon one side and one end.

The operation of the labeling mechanism is as follows: After leaving the brush $W^4$ the mandrel carries the box-cover beneath the label-hopper, which by the lowering of the arm $Q^5$ is permitted to slide down the bar $B^4$ and place the lowermost label of the pile therein upon the pasted side of the box-cover. The lowering of the arm $Q^5$ also permits the descent of the plate $O^5$, which has previously been raised to such a height as to carry the pawl or grip-bar $B^5$ well above the top of the hopper, so as to enable the same to grip or bind against the follower-rod. Such descent of the plate $O^5$ is accompanied by the lowering of the bar $M^5$ and the follower, in consequence of the connection between said bar $M^5$ and the follower-rod, and when such movement has proceeded far enough the free end of the bar $M^5$ strikes against the upper edge of the hopper side, and being lifted thereby releases the follower-rod and permits the dropping of the follower upon the pile of labels with sufficient force to affix the lowermost label to the box-cover upon the mandrel. The hopper is swung upon its pivotal connection with the shaft C during the operations above set forth, so as to keep pace with the onward movement of the mandrel, by the cam-actuated mechanism provided for that purpose. The label having been applied the arm $Q^5$ is actuated by the cam and first operates to raise the plate $O^5$, which tilts the pawl or grip-bar $N^5$ to bind the same against the follower-rod and results in the lifting of the follower by the plate $O^5$. Further movement of the arm $Q^5$ places it in engagement with the plate $P^5$ on the hopper, and the latter is thereby moved longitudinally upward along the bar $B^5$ to remove it from the mandrel. To insure that the relative position of the hopper and mandrel shall be maintained during the travel of the mandrel, and as supplementing the cam mechanism described hereinbefore for moving said hopper in the direction of travel of the mandrel, a roller $S^5$ pivoted upon a rod $t^5$ projecting horizontally from a plate $T^5$ secured to the hopper side is supported just below the hopper in such position as to be engaged by the forward end of the box-cover upon the mandrel as soon as said cover is placed in proper position below the hopper to receive a label therefrom, and the hopper thus moved along with the mandrel. The roller rides easily off the cover on the mandrel when the hopper is moved upward by the arm $Q^5$. To hold the sleeve $A^5$ from endwise movement upon the shaft C the upper rounded end of the rod-guide $L^6$ is placed within a slot $u^5$ in a plate $U^5$ secured to the journal-cap of the standard $B'$. Of course other means may be employed for this purpose without departure from our invention.

Projecting horizontally from the annular frame S is a pin $v^5$, upon which is pivoted a plate $V^5$, whose free end is in the path of the mandrels after the same leaves the label-affixing mechanism and is adapted to engage the label and insure the thorough attachment of the same to the box-cover. A coiled spring $v^6$ holds said plate yieldingly in the path of the mandrels, movement of the plate by the spring being limited by a lug $v^7$ thereon that engages a stop-arm $v^8$ fixed to the pin $v^5$.

Mounted slidingly upon each mandrel is a collar $W^5$ that upon its outer face is provided with a projection $w^5$ to engage the inner end of the box-cover to push the same off the mandrel. Engaging an annular groove in the collar is a forked arm $x^5$ attached to one end of a rod or bar $X^5$ slidingly mounted in lugs or projections $k^4$ $k^4$ on the outer end of the spider-arm $k$. At a point between said lugs the rod $X^5$ carries a roller $x^6$, which is adapted to engage in succession two cam-bars $Y^5$ and $Y^6$, suitably supported from the annular frame S, and move the rod, first, to slide the collar $W^5$ to eject the box-cover from the mandrel and then to retract said rod to clear the mandrel for making another box-cover.

A chute $Z^5$ receives the box-covers as they are removed from the mandrels and delivers them to one side of the machine.

The operation of our machine is as follows: The hopper U being supplied with blanks of wood veneer, suitably scored in four places to permit bending thereof, and power being applied to the shaft G, the bottom blank in the hopper will be engaged by the arm X and fed out therefrom in the path of one of the mandrels. Said mandrel will engage the blank with one of its small sides midway between its ends and moving onward will force the same against and between the two plates $C'$ and $G'$, causing the projecting portions of the blank to be turned against the long sides of the mandrel, with its two ends projecting a short distance beyond the mandrel. One of said ends is next folded upon the mandrel by the finger $P'$, to and past which the mandrel is carried, and then the remaining end is folded upon the other by the finger $Y'$, to coöperate with which the mandrel is partially revolved by the cam-operated segment O. The mandrel is revolved upon its own axis sufficiently to place the small side upon which the overlapped ends of the blank are folded downward to enable the covering and holding paper to be first attached to such overlapped ends. When the mandrel reaches such position the free end of the paper is pasted thereto by the roller $O^3$, which is moved upward slightly to meet the mandrel and then yields downward before the latter and passing along one of the wide sides thereof pastes the paper to the blank upon such side. As the paper is first affixed to the blank a short distance from its end, a short flap of paper is left projecting from the blank, and such flap is engaged and pasted to a portion of the opposite side of the blank by the two rollers $S^3$ and $T^3$ during the operation of the roller $O^3$. From the time the paper is first affixed to the blank the mandrel, as it is moved onward, draws the paper off the roll $D^3$, and when, in addition to the portions already described as having been applied to the blank, enough has been drawn off to completely cover the blank the paper is moved against the knife $x^3$ by the roller $Y^3$ and severed from the roll $D^3$. Further travel of the mandrel and rotation upon its own axis causes the folding and pasting of the paper upon the second small side of the blank by the roller $E^4$, and then the roller $I^4$ folds and pastes the remaining portion of the paper upon the second wide side of the blank, and thus completes the box cover or casing. In passing from the roller $E^4$ to the roller $I^4$ the mandrel is given a partial revolution upon its own axis to properly present the blank for the action of said roller. The box cover or casing is now complete, and it remains only to apply the label and remove the same from the mandrel. From the roller $E^4$ the mandrel is carried by the revolution of the shaft C to the paste-applying roller $O^4$, and as it is desirable to apply the label upon the overlapped ends of the paper the mandrel is given a half-revolution to place the side of the cover uppermost that contains such ends, for the placing thereon of paste by the roller $O^4$. Traveling from the latter the brush smoothes the paste evenly upon the cover, and then the label is fed from the hopper $C^5$ upon the pasted surface by the mechanism hereinbefore fully described and firmly pressed thereon by the plate $V^5$, to which the mandrel is duly carried by the revolution of the shaft C. The label being now applied, the box-cover is next removed from the mandrel by the ejector $w^5$, actuated by the cam $y^5$, and, falling into the chute $Z^5$, is carried from the machine.

It will be understood that the revolution of the shaft C and the series of mandrels is continuous and that at the time of the removal of the finished and labeled cover from one mandrel each of the other mandrels is engaged in the making of a cover or casing.

While we have described the use of wood veneer with our machine for the manufacture of covers or casings, we of course do not limit ourselves only to the use of such or any particular material; and it is also to be understood that we do not limit ourselves to the precise construction and arrangement of parts as herein described and shown, as changes can be made in many respects which will involve no departure from our invention.

Having thus described our invention, what we claim is—

1. In a machine for making box-covers, the combination of a traveling mandrel, a source of supply of blanks, the two pivoted folding-plates in the path of the mandrel, means for feeding one blank at a time from the source of supply to a position in line with said plates, the devices for folding the ends of the blank upon the mandrel, and the series of rollers for attaching paper to the folded blanks, substantially as and for the purpose specified.

2. In a machine for making box-covers, the combination of a revolving carrier, a series of rotary mandrels carried thereby, a source of supply of blanks, the two pivoted folding-plates in the path of the mandrels, means for feeding one blank at a time from the source of supply to a position in line with said plates, the devices for folding the ends of the blanks upon the mandrel, and the series of rollers for attaching paper to the folded blank, substantially as and for the purpose specified.

3. In a machine for making box-covers, the combination of a revolving carrier, a series of rotary mandrels carried thereby, a source of supply of blanks, means for feeding blanks one at a time into the path of the mandrels, the devices for folding a blank upon each mandrel, a source of supply of paper, the series of rollers for attaching the paper to the blank, and the cutting mechanism for severing the paper from the roll, substantially as and for the purpose specified.

4. In a machine for making boxes, the combination of a traveling mandrel, folding devices for co-operating therewith and a label-affixing device adapted to move along with the mandrel, substantially as and for the purpose shown.

5. In a machine for making box parts, the combination of the revolving mandrel-carrier, a label-holder adapted to move along with the mandrel and means for feeding a label therefrom to the box part upon the mandrel, substantially as and for the purpose specified.

6. In a machine for making box parts, the combination of the revolving mandrel-carrier, a pivoted label-holder, means for moving the same to and from the path of the mandrel, and means for feeding a label therefrom to the box part upon the mandrel, substantially as and for the purpose specified.

7. In a machine for making box parts, the combination of the revolving mandrel-carrier, a label-holder adapted to move along with the mandrel pivoted concentric therewith, means for moving the same to and from the path of the mandrel, means for moving said label-holder along with the mandrel, and means for feeding a label therefrom to the box part upon the mandrel, substantially as and for the purpose specified.

8. In a machine for making box parts, the combination of the traveling mandrel, a label-holder adapted to move along with the mandrel, the follower for feeding a label to a box part upon the mandrel, means for alternately lifting and dropping said follower, and means for moving the label-holder to and from the path of the mandrel substantially as and for the purpose specified.

9. In a label-affixing machine, the combination of a label-holder, the follower for feeding labels therefrom having a rod or stem, the rocking pawl or grip through which the latter passes, the reciprocating plate engaging said pawl, and moving the same and the rod, and a relatively-fixed part to engage the pawl to release the rod therefrom, substantially as and for the purpose specified.

10. In a label-affixing machine, the combination of a label-holder, the follower for feeding labels therefrom, having a rod or stem, a clutch device adapted to be engaged with and disengaged from said rod, means connected with said clutch device for moving the follower away from the labels and means to disengage said clutch device from the rod, to permit movement of the follower in the opposite direction, substantially as and for the purpose specified.

11. In a label-affixing machine, the combination of the label-holder, the follower for feeding labels therefrom, having a rod or stem, a pawl adapted to be moved into and out of engagement with the rod, means connected with said pawl for raising the same and said follower, and means to disengage the pawl and rod, to permit the follower to drop, substantially as and for the purpose shown.

12. In a machine for making box parts, the combination of the traveling mandrel, a paste-applying device in the path thereof, a label-holder, and means to feed labels therefrom, substantially as and for the purpose specified.

13. In a machine for making box parts, the combination of the traveling mandrel, a paste-applying device in the path thereof, a brush, also in said path, a label-holder, and means to feed labels therefrom, substantially as and for the purpose specified.

14. In a machine for making box parts, the combination of the traveling mandrel, a paste-applying device in the path thereof, a label-holder, means for feeding labels therefrom, and a device for pressing a label to the box part upon the mandrel, substantially as and for the purpose specified.

15. In a machine for making box parts, the combination of the traveling mandrel, a movable paste-receptacle having its paste-delivering part normally in the path of the mandrel, and adapted to be moved by the latter to one side of such path, substantially as and for the purpose shown.

16. In a machine for making box parts, the combination of the traveling mandrel, and a movable paste-receptacle having a roller at its bottom normally in the path of such mandrel, and adapted to be moved by the latter to one side of such path, substantially as and for the purpose specified.

17. In a machine for making box parts, the combination of the revolving mandrel-carrier, a label-holder, a pivoted bar upon which said holder is slidingly mounted, a follower to feed labels from the holder, having a rod or stem, a reciprocating plate, a pawl or grip to connect the latter and the rod or stem, an arm for raising said plate and the label-holder, means for causing the lowering thereof, means for releasing the pawl or grip from the rod or stem, and means for swinging the pivoted label-holder bar, substantially as and for the purpose specified.

In testimony that we claim the foregoing we have hereunto set our hands this 15th day of July, 1895.

CHARLES LOYENS.
    ANDERS PAULSON.

Witnesses:
 JOS. JONKERS,
 H. P. TEURLINGS.